United States Patent [19]

Geibel et al.

[11] Patent Number: 5,296,579

[45] Date of Patent: Mar. 22, 1994

[54] ARYLENE SULFIDE POLYMERS

[75] Inventors: Jon F. Geibel; Robert W. Campbell, both of Bartlesville, Okla.; Guy Senatore; Fernando C. Vidaurri, both of Borger, Tex.; Mark A. Haney, Algonquin, Ill.

[73] Assignee: Phillips Petroleum Company, Bartlesville, Okla.

[21] Appl. No.: 155,179

[22] Filed: Feb. 11, 1988

[51] Int. Cl.$^5$ ............................................. C08F 8/32
[52] U.S. Cl. .................................. 528/379; 528/387; 528/388
[58] Field of Search ................... 528/388, 374, 387; 525/537

[56] References Cited

U.S. PATENT DOCUMENTS

| | | | |
|---|---|---|---|
| 3,098,103 | 7/1963 | Reifschneider | 260/609 |
| 3,386,950 | 6/1968 | Horvath et al. | 260/45.7 |
| 3,706,702 | 12/1972 | Studinka et al. | 528/374 |
| 3,725,362 | 4/1973 | Walker | 260/79 |
| 3,853,824 | 12/1974 | Tieszen | 260/79 |
| 3,870,686 | 3/1975 | Campbell | 260/79.1 |
| 3,919,177 | 11/1975 | Campbell | 260/79.1 |
| 3,940,375 | 2/1976 | O'Shaughnessy et al. | 260/79.1 |
| 3,941,748 | 3/1976 | King | 528/374 |
| 4,544,735 | 10/1985 | Geibel et al. | 528/374 |
| 4,605,732 | 8/1986 | Heitz et al. | 528/388 |
| 4,760,127 | 7/1988 | Ebert et al. | 528/388 |
| 4,760,128 | 7/1988 | Ebert et al. | 528/388 |

FOREIGN PATENT DOCUMENTS

| | | |
|---|---|---|
| 0225471 | 6/1987 | European Pat. Off. |
| 3529500 | 2/1987 | Fed. Rep. of Germany |
| 3529501 | 2/1987 | Fed. Rep. of Germany |

*Primary Examiner*—John C. Bleutge
*Assistant Examiner*—Mark Sweet
*Attorney, Agent, or Firm*—J. D. Brown

[57] ABSTRACT

A process for the production of arylene sulfide polymers is provided which comprises subjecting a mixture of at least one first sulfur source, at least one second sulfur source comprised of at least one organic monothiol compound, at least one polyhalo-substituted aromatic compound and at least one polar organic compound to polymerization conditions sufficient to produce the arylene sulfide polymer. The organic monothiol compound can be added at any time prior to substantial completion of polymerization to provide arylene sulfide polymers of increased extrusion rate.

38 Claims, No Drawings

ARYLENE SULFIDE POLYMERS

FIELD OF INVENTION

This invention relates to processes for the production of polymers from aromatic compounds. In one aspect, this invention relates to processes for the production of arylene sulfide polymers. In another aspect, this invention relates to processes for the production of phenylene sulfide polymers. In still another aspect, this invention relates to processes for the production of poly (p-phenylene sulfide) having a high extrusion rate.

BACKGROUND OF THE INVENTION

U.S. Pat. No. 3,354,129 discloses a basic process for the production of arylene sulfide polymers from polyhalo-substituted aromatic compounds by reaction with an alkali metal sulfide in a polar organic solvent. Since then much work has been done to provide methods of modifying or controlling the melt flow rate of arylene sulfide polymers thus produced. For example, the use of curing or chain extension reactions are known for decreasing the melt flow rate. In addition, the use of alkali metal carboxylates and/or polyhalo-substituted aromatic compounds having three or more halogen atoms per molecule in the polymerization reaction mixture also is known to reduce melt flow rate. On the other hand the use of excess dihalo-substituted aromatic compound reactant is also known to provide arylene sulfide polymers of increased melt flow rate.

It is generally considered that a melt flow rate is inversely related to polymer molecular weight. Extrusion rate is a specific type of melt flow rate particularly useful for characterizing arylene sulfide polymers in the lower molecular weight range. As used herein, the term extrusion rate refers to a flow rate measurement on molten polymer based on ASTM D1238, Procedure B-Automatically Timed Flow Rate Measurement, Condition 315/0.345, using a five minute preheat time and an orifice having the dimensions of 0.0825±0.0002 inch diameter and 1.250±0.002 inch length.

There is a growing need for arylene sulfide polymers of high extrusion rate for use in applications such as encapsulation of electronic components and in coatings formulations. Current methods for reproducibly preparing such arylene sulfide polymers of high extrusion rate suffer from various drawbacks such as the need for recycling excess reactants which can entail costly added separation steps.

It is therefore an object of this invention to provide a method for producing arylene sulfide polymer of a desired extrusion rate in a readily controllable manner. It is another object of this invention to provide a method for producing arylene sulfide polymer having a high extrusion rate. It is another object of this invention to provide a method for producing poly(p-phenylene sulfide) having an extrusion rate of about 50 to about 1,000 g/10 min.

BRIEF STATEMENT OF THE INVENTION

We have discovered a process for preparing arylene sulfide polymer comprising adding, at any time prior to substantial completion of polymerization, a second sulfur source comprised of at least one organic monothiol compound to a polymerization reaction mixture comprised of at least one first sulfur source, at least one polyhalo-substituted aromatic compound, and at least one polar organic compound.

DETAILED DESCRIPTION OF THE INVENTION

According to one embodiment of our invention we have discovered a method for increasing the extrusion rate of arylene sulfide polymer in a readily controllable manner by adding a second sulfur source comprised of at least one organic monothiol compound to a polymerization reaction mixture comprised of at least one first sulfur source, at least one polyhalo-substituted aromatic compound, and at least one polar organic compound and subjecting said reaction mixture to polymerization conditions sufficient to produce said arylene sulfide polymer. The amount of organic monothiol compound employed according to our invention is an amount effective to provide arylene sulfide polymers of increased extrusion rate. In this manner arylene sulfide polymers having an extrusion rate of at least about 50 g/10 minutes, preferably about 75 to about 1000 g/10 minutes, more preferably about 100 to about 500 g/10 minutes, are readily produced.

The organic monothiol compound which is utilized as a second sulfur source according to our invention is represented by the formula Z-S-R'. Z is a halogen-free cyclic organic radical preferably containing a total of about 5 to about 25 carbons atoms. Z can be selected from carbocyclic and heterocyclic radicals having 1 to 4 heteroatoms as cycle members. Said heteroatoms are individually selected from the group consisting of nitrogen, oxygen and sulfur. The halogen-free cyclic organic radical Z can also have 0 to about 4 substituents selected from the group consisting of alkyl, cycloalkyl, aryl, alkoxy, aryloxy, alkanoyl, alkanoyloxy, aroyl, alkoxycarbonyl, alkanamido, alkylamino, and alkylsulfonyl radicals.

The -S-R' of said Z-S-R' is attached directly to a carbon atom which is a cycle member of Z.

In the organic monothiol compound Z-S-R', R' is selected from the group consisting of H and M/y where M is a metal having a valence y selected from the group consisting of lithium, sodium, potassium, rubidium, cesium, magnesium, calcium, strontium, and barium. Thus, according to our invention the organic monothiol compound can be employed as the thiol per se or as a metal salt thereof, i.e. a metal thiolate, wherein the metal is selected from the list given above. When a metal thiolate is employed according to our invention, it can be formed in situ from the reaction of the organic monothiol with a suitable metal compound such as a metal oxide, metal hydride or metal hydroxide where the metal is selected from the list given above. Examples of suitable metal compounds for use in the in situ formation of the metal thiolate include lithium hydroxide, sodium hydroxide, potassium hydroxide, rubidium hydroxide, cesium hydroxide, lithium hydride, sodium hydride, magnesium oxide, calcium oxide, strontium oxide and barium oxide.

Examples of suitable halogen-free cyclic organic radicals Z in the organic monothiol compound Z-S-R' include phenyl, 2-pyridyl, 2benzo[b]-thienyl, 6-isobenzofuranyl, 2-pyrazinyl, 2-indolizinyl, 1-naphthyl, 4-biphenylyl, 3-quinolyl, 2-anthryl, 2-thianthrenyl, 2-phenoxathiinyl, 2-acridinyl, 4-isoquinolyl, 1-phenazinyl, 7-quinoxalinyl, 6-quinazolinyl, 4-tert-amylphenyl, 2-sec-butylphenyl, 2-tert-butylphenyl, 4-tert-butylphenyl, 2,4-di-tert-butylphenyl, 2,6-diethylphenyl, 3,4-dimethylphenyl, 4-ethylphenyl, 2-isopropylphenyl, 2-methoxyphenyl, 3-methoxyphenyl, 4-methoxyphenyl, 2-methylphenyl, 3-methylphenyl, 4-methylphenyl, 2,4,5-trimethylphenyl, 4-ethylaminophenyl, 4-methanamidophenyl, 4-ethylsulfonylphenyl, 3-acetylphenyl, 4-acetoxyphenyl, and 4-carbethoxyphenyl.

Examples of suitable organic monothiol compounds, Z-S-R', for use according to our invention include benzenethiol, 2-pyridinethiol, benzo[b]thiophene-2-thiol, 4-pyridinethiol, 1-naphthalenethiol, 4-biphenylthiol, 3-quinolinethiol, 4-quinolinethiol, 5-quinolinethiol, 8-quinolinethiol, 9-anthracenethiol, 9-acridinethiol, 1-phenazinethiol, 2-quinoxalinethiol, 4-quinazolinethiol, 2-quinazolinethiol, 2-benzimidazolethiol, 2-benzothiazolethiol, p-isopentylbenzenethiol, p-sec-butylbenzenethiol, p-tert-butylbenzenethiol, 2,5-di-tert-butylbenzenethiol, 2,5-diethylbenzenethiol, 2,6-diethylbenzenethiol, 2,6-dimethylbenzenethiol, o-ethylbenzenethiol, p-ethylbenzenethiol, 4-(1-methylethyl)benzenethiol, p-methoxybenzenethiol, o-methoxybenzenethiol, m-methoxybenzenethiol, 2,3,5-trimethylbenzenethiol, 4-(dimethylamino)benzenethiol, 2-(ethylamino)benzenethiol, p-methylsulfonylbenzenethiol, 2-benzoxazolethiol, 2-pyrimidinethiol, o-methylsulfonylbenzenethiol, m-methylsulfonylbenzenethiol, 2-acetylbenzenethiol, 3-acetylbenzenethiol, 4-mercaptophenol-1-acetate, methyl 4-mercaptobenzoate, 2-mercapto-N-methylbenzamide, 4-mercapto-N-methylbenzamide, sodium benzenethiolate, lithium benzenethiolate, potassium 1-naphthalenethiolate, rubidium p-ethylbenzenethiolate, cesium 9-anthracenethiolate, magnesium benzenethiolate, calcium benzenethiolate, strontium benzenethiolate, barium benzenethiolate, and the like, and mixtures thereof.

The amount of organic monothiol compound employed according to our invention as a second sulfur source is an amount effective to provide arylene sulfide polymers of increased extrusion rate and is conveniently expressed in terms of a mole fraction based on the sum of moles of first and second sulfur sources. Thus, the mole fraction of the second sulfur source (organic monothiol compound) is defined as:

$$\frac{\text{moles second sulfur source}}{\text{moles first sulfur source} + \text{moles second sulfur source}}.$$

The mole fraction of organic monothiol compound generally employed in our invention is about 0.001 to about 0.1, preferably about 0.002 to about 0.05.

According to our invention the organic monothiol compound can be added to the mixture of components at any time prior to substantial completion of polymerization. Thus, the organic monothiol compound can be added in total initially before the mixture of components is subjected to polymerization conditions. Alternatively, a portion of the organic monothiol compound can be added initially with the balance added in a single portion or multiple increments during the polymerization period. As a further alternative, no organic monothiol compound is added initially but is added in a single portion or in multiple portions during the polymerization period but prior to substantial completion of polymerization.

The organic monothiol compound can be added neat or in admixture with one or more of the other polymerization mixture components. It is particularly convenient to add the organic monothiol compound in admixture with a portion of the polar organic compound component that is to be utilized.

According to our invention, compounds suitable as the first sulfur source include alkali metal sulfides, alkali metal hydrosulfides, and hydrogen sulfide. Suitable alkali metal sulfides include lithium sulfide, sodium sulfide, potassium sulfide, rubidium sulfide and cesium sulfide. Suitable alkali metal hydrosulfides include lithium hydrosulfide, sodium hydrosulfide, potassium hydrosulfide, rubidium hydrosulfide and cesium hydrosulfide. Sodium sulfide and sodium hydrosulfide are presently preferred as suitable first sulfur sources. It is often convenient to employ these first sulfur source compounds as aqueous solutions or dispersions in the process of our invention.

The polyhalo-substituted aromatic compounds which can be employed in the method of our invention are compounds wherein the halogen atoms are attached to aromatic ring carbon atoms. Preferably, the polyhalo-substituted aromatic compounds are selected from the group consisting of p-dihalobenzenes having the formula

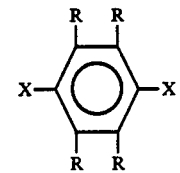

m-dihalobenzenes having the formula,

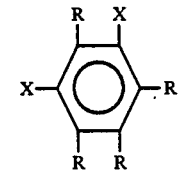

and o-dihalobenzenes having the formula

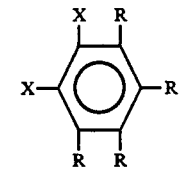

wherein X is a halogen selected from the group consisting of chlorine, bromine and iodine and R is hydrogen or an alkyl radical of 1–4 carbon atoms. For reasons of availability and generally good results it is more preferred that dichlorobenzenes be employed according to our invention with p-dichlorobenzene being especially preferred. Mixtures of suitable polyhalo-substituted aromatic compounds can be employed according to our invention.

Further, according to our invention, polyhalo-substituted aromatic compounds having more than two halogen substituents per molecule can be employed. These compounds are represented by the formula $R''(X)_n$ wherein X is as previously defined, $R''$ is a polyvalent aromatic radical of 6 to about 16 carbon atoms having a valence n and n is an integer of 3–6. Generally, the polyhalo-substituted aromatic compounds represented by the formula R''(X)$_n$ when employed according to our invention are optional components utilized in small amounts in admixture with suitable dihalo-substituted aromatic compounds.

Examples of some suitable polyhalo-substituted aromatic compounds include 1,4-dichlorobenzene, 1,3-dichlorobenzene, 1,2-dichlorobenzene, 1,4-dibromobenzene, 1,4-diiodobenzene, 1-chloro-4-bromobenzene, 1-bromo-4-iodobenzene, 2,5-dichlorotoluene, 2,5-dichloro-p-xylene, 1-ethyl-4-isopropyl-2,5-dibromobenzene, 1,2,4,5-tetramethyl-3,6-dichlorobenzene, 1,2,3-trichlorobenzene, 1,2,4-trichlorobenzene, 1,3-dichloro-5-bromobenzene, 2,4,6-trichlorotoluene, hexachlorobenzene, 2,2',4,4'-tetrachlorobiphenyl, 2,2',6,6'-tetrabromo-3,3',5,5'-tetramethylbiphenyl, 4,4'-dichlorobiphenyl and the like.

Although the amount of polyhalo-substituted aromatic compound relative to the total of the sulfur source compounds can vary over a wide range, generally the amount employed will be about 0.5 gram equivalents of aromatic halide per gram equivalent of total sulfur source compounds to about 2.0 gram equivalents of aromatic halide per gram equivalent of total sulfur source compounds. Preferably, the amount will be about 0.95:1 to about 1.1:1 expressed on the same basis as before.

Polar organic compounds which can be employed according to the process our invention include organic amides, lactams, ureas, sulfones and the like. Examples of suitable polar organic compounds include N-methyl-2-pyrrolidone, N-methylcaprolactam, hexamethylphosphoramide, tetramethylurea, N,N'-ethylene dipyrrolidone, pyrrolidone, caprolactam, N-ethylcaprolactam, 1,3-dimethyl-2-imidazolidinone, tetramethylene sulfone, N-ethyl-2-pyrrolidone, 1-methyl-4-isopropyl-2-piperazinone, 1,4-dimethyl-2-piperazinone, and mixtures thereof. For reasons of availability, stability and generally good results N-methyl-2-pyrrolidone is a preferred polar organic compound for use according to our invention. The amount of polar organic compound employed according to the process of our invention can be expressed in terms of a molar ratio of polar organic compound to total sulfur source compounds. Thus, this ratio will be about 1.5:1 to about 25:1, preferably about 2:1 to about 8:1.

Although the reaction temperature at which the polymerization is conducted can vary over a wide range, generally it will be about 125° C. to about 375° C., preferably about 175° C. to about 350° C. The reaction time can vary widely, depending in part on the reaction temperature, but generally will be about six minutes to about 72 hours, preferably about one hour to about eight hours. The pressure should be sufficient to maintain the organic components of the reaction mixture substantially in the liquid phase.

The arylene sulfide polymers produced by the process of our invention can be separated from the reaction mixture by conventional procedures, e.g. by filtration of the polymer, followed by washing with water or by dilution of the reaction mixture with water, followed by filtration and water washing of the polymer.

The arylene sulfide polymers produced by the process of our invention can be blended with fillers, pigments, extenders, other polymers, and the like. The polymers can be cured through crosslinking and/or chain extension, e.g., by heating at temperatures up to about 480° C. in the presence of a free oxygen-containing gas, to provide cured products having high thermal stability and good chemical resistance. They are useful in the production of coatings, films, molded objects, and fibers.

EXAMPLES

Examples are provided in an effort to assist one skilled in the art to a further understanding of our invention, and yet not be unduly limitative of the reasonable scope of the invention. The particular reactants, conditions, ratios, and the like, are all intended to be illustrative of our invention and not limitative of the reasonable and suitable scope thereof.

EXAMPLE I

A series of polymerization runs were performed in a two gallon, fast stirring stainless steel autoclave. Heating was accomplished by electric heating mantles. The autoclave was equipped with thermostatically controlled cooling coils, a safety pressure rupture disc, manually controlled pressure release ports, isolable distillation condenser, and isolable monomer charging cylinder. The autoclave and charging cylinder both had pressure gauges and nitrogen inlet valves. The temperature of the reaction mixture was recorded by a J-type thermocouple in a thermocouple well in the autoclave. The temperature was displayed on a digital thermocouple readout.

A typical 6.00 mole scale polymerization was performed according to the following procedure: The autoclave was charged with aqueous sodium hydrosulfide (6.00 moles, 563.4 grams, 59.700 weight percent NaSH), sodium hydroxide (6.05 moles, 242.0 grams), and N-methyl-2-pyrrolidone (1600 ml, 16.56 moles).

The autoclave was sealed up, agitation was started, and degassing was accomplished by pressurizing the reactor to 25 psig with nitrogen and then releasing the pressure for a total of five pressurize-release cycles. A slow nitrogen purge (1 SCFH) is then flushed through the autoclave into the overhead take-off condenser. The autoclave was then heated to approximately 155° C. At this temperature the first drops of condensate were collected and the nitrogen purge was discontinued. Approximately 40 minutes elapsed time are required to collect the first drops of condensate. When the temperature reached 160° C., a five minute hold allowed thermal equilibrium to be established. The temperature was then raised to 200° C. over a period of approximately 45 minutes. During this time approximately 330 ml of aqueous condensate was collected.

At the conclusion of the dehydration the autoclave was sealed up and cooled to 175° C. with the internal cooling coils. At this time a solution of p-dichlorobenzene (6.15 moles, 904.1 grams) and, optionally, thiophenol (0.045 moles, 5.00 grams) in N-methyl-2-pyrrolidone (3.36 moles, 325 ml) was pressured into the autoclave. The autoclave was then "blocked in" and the temperature raised to 235° C. and held for one hour. The temperature was raised to 265° C. and held for another hour. The temperature was raised to the final temperature of 280° C. and held there for one hour. The reaction mixture was then allowed to cool overnight.

Opening the autoclave the next morning revealed a grey solid product. The crude product was washed with hot (90° C.) deionized water and collected by filtration. The washing procedure was performed until the filtrate was colorless (typically 2-3 washes). The product was then given one cold deionized water wash and filtered. The product was then dried to a constant weight in a forced air oven at approximately 120° C. The resulting polymer was an off-white, free flowing powder. Extrusion rates were measured on molten polymer based on ASTM D1238, Procedure B-Automatically Timed Flow Rate Measurement, Condition 315/0.345, using a 5 minute preheat time and an orifice having the dimension of 0.0825±0.0002 inch diameter and 1.250±0.002 inch length. Results are reported in g/10 minutes.

The polymerization recipe employed for this series of runs is shown below.

| Compound | g-mole |
|---|---|
| N-methyl-2-pyrrolidone (NMP) | 19.92 |
| Sodium hydroxide (NaOH) | 6.05 |
| Sodium hydrosulfide (NaSH) | 6.00 |
| Thiophenol ($\phi$SH) | Variable |
| p-Dichlorobenzene (p-DCB) | 6.15 |

The results from the runs are presented in Table I below.

TABLE I

| Run No. | Total g-mole Sulfur Sources | $\phi$SH g-mole | Mole Fraction $\phi$SH | Extrusion Rate g/10 min |
|---|---|---|---|---|
| 1 | 6.00 | 0 | 0 | 38 |
| 2[a] | 6.00 | 0 | 0 | 30 |
| 3 | 6.018 | 0.018 | 0.003 | 55 |
| 4 | 6.045 | 0.045 | 0.008 | 85 |
| 5[a] | 6.045 | 0.045 | 0.008 | 67 |
| 6 | 6.077 | 0.077 | 0.013 | 164 |

[a]Runs made with a new lot of sodium hydrosulfide.

a) Runs made with a new lot of sodium hydrosulfide.

Runs 1 and 2 are control runs not using an organic monothiol compound. The results for Runs 3–6 presented in Table I demonstrate that the use of an organic monothiol compound according to our invention provides a convenient way to increase significantly the extrusion rate of arylene sulfide polymers.

EXAMPLE II

Other runs were made in the manner of those in Example I. These runs examined the effect of increasing the amount of p-DCB in the polymerization recipe along with the use of thiophenol according to our invention. The polymerization recipe utilized in these runs is shown below.

| Compound | g-mole |
|---|---|
| NMP | 19.92 |
| NaOH | 6.05 |
| NaSH | 6.00 |
| Thiophenol ($\phi$SH) | variable |
| p-DCB | variable |

The results from these runs are presented below in Table II.

TABLE II

| Run No. | p-DCB g-mole | Total g-mole Sulfur Sources | $\phi$SH g-mole | Mole Fraction $\phi$SH | Extrusion Rate g/10 min |
|---|---|---|---|---|---|
| 2 | 6.15 | 6.00 | 0 | 0 | 30 |
| 5 | 6.15 | 6.045 | 0.045 | 0.008 | 67 |
| 7 | 6.30 | 6.00 | 0 | 0 | 73 |
| 8 | 6.30 | 6.045 | 0.045 | 0.008 | 176 |

The results shown in Table II demonstrate that an increase in the p-DCB stoichiometric excess can increase the extrusion rate (Run 7 vs. Run 2) of arylene sulfide polymers. However, the results for Runs 5 and 8 show that the use of thiophenol according to our invention can provide an additional large increase in extrusion rate beyond that achieved by increasing the excess p-DCB (Run 8 vs. Run 7). Thus, both effects can be utilized in obtaining arylene sulfide polymers having high extrusion rates.

EXAMPLE III

Additional larger scale runs were made according to our invention utilizing a 90 gallon stirred reactor (about 400 rpm) for the preparation of poly(p-phenylene sulfide) (PPS). These runs employed N-methyl-2-pyrrolidone (NMP), aqueous NaOH, aqueous NaSH, p-dichlorobenzene (p-DCB), and thiophenol (except in control runs) in the process for preparing PPS.

A typical run in this series employed the following general procedures. The aqueous NaOH and aqueous NaSH were premixed in a separate heated vessel. The warmed (about 115° C.) liquid mixture was charged, with a following NMP flush, to the reactor containing the remaining NMP. This mixture was subjected to a dehydration step wherein water plus some NMP was removed from the reactor by distillation at a reflux ratio of 1/1. Takeoff overhead started at a reactor temperature of 166° C. and ended at 230°–232° C. over a period of 80–84 minutes.

Molten p-DCB was then charged to the reactor at about 230° C. and the reaction mixture held at about 230° C. for one hour than at about 275° C. for 1.5 hours. If thiophenol was used, it was charged with about 2 gallons of NMP to the reactor at about 190° C. prior to the addition of p-DCB for this series of runs. Also, when thiophenol was used the polymerization recipe was further adjusted by adding an additional one equivalent of NaOH and p-DCB for each equivalent of thiophenol.

The reactor was vented with recovery of volatiles over about one hour to 55 psig, heated at about 282° C. and the reactor contents then transferred to another vessel wherein reduced pressure conditions caused the remaining NMP and other volatiles to be flashed overhead for recovery.

The reaction mixture comprising PPS was washed several times with water utilizing a PPS slurry mixing tank then a nylon fabric moving belt filter system to separate the PPS from the wash/rinse liquid. The washed PPS obtained from each run was dried and a sample tested for extrusion rate according to the method described above.

The results obtained for this series of runs are presented in Table III below. The molar ratios shown are values normalized to NaSH of 1.000.

TABLE III

| Run No. | Molar Ratio[a] | | | Mole Fraction | Extrusion Rate |
|---|---|---|---|---|---|
| | NaOH | p-DCB | $\phi$SH | $\phi$SH | g/10 min |
| 9 | 0.985 | 1.028 | 0 | 0 | 48 |
| 10 | 0.985 | 1.028 | 0 | 0 | 44 |
| 11 | 0.993 | 1.030 | 0.006 | 0.006 | 87 |
| 12 | 0.996 | 1.033 | 0.010 | 0.010 | 140 |
| 13 | 0.998 | 1.035 | 0.013 | 0.012 | 203 |

[a]Relative to NaSH of 1.000, normalized.

Runs 9 and 10 are control runs which employed no organic monothiol compound. Runs 11–13 show that the extrusion rate of PPS can be readily increased by employing increasing amounts of an organic monothiol compound.

EXAMPLE IV

Another run (Run 14) was conducted in essentially the same manner as Run 12 in Example III except that the thiophenol was added to the reactor at 232° C. instead of about 190° C. The recovered PPS sample had an extrusion rate of 180 g/10 minutes. This result indicates a relatively small increase in extrusion rate was achieved by using the higher reactor temperature (232° C. vs. about 190° C.) at thiophenol addition. However, caution should be exercised since thiophenol may be unstable in the absence of air at temperatures above 200° C.

EXAMPLE V

Another run (Run 15) was carried out according to our invention in essentially the same manner as Run 12 of Example III except that for Run 15 no adjustment in the polymerization recipe was made by the addition of one equivalent of NaOH and p-DCB for each equivalent of thiophenol. The recovered PPS sample for Run 15 had an extrusion rate of 171 g/10 minutes which is only slightly higher than the result of Run 12. The result from Run 15 indicates that no polymerization recipe adjustment in NaOH and p-DCB need be made when using thiophenol according to our invention.

EXAMPLE VI

An additional run (Run 16) was carried out according to our invention in essentially the same manner as Run 14 of Example IV except that for Run 16 the thiophenol was added to the reactor after the p-DCB was charged to the reactor instead of before the p-DCB as in Run 14. The recovered PPS sample for Run 16 had an extrusion rate of 199 g/10 minutes which is near the value of 180 g/10 minutes for the PPS of Run 14.

These results indicate that the order of addition of the polyhalo-substituted aromatic compound reactant and the organic monothiol compound at the beginning is not a critical factor in obtaining the results desired. However, if the addition of the organic monothiol compound is delayed as polymerization proceeds the influence on arylene sulfide polymer extrusion rate will be smaller for a given amount of organic monothiol compound than if the organic monothiol compound was present at the onset of polymerization.

We claim:

1. A process for preparing arylene sulfide polymer comprising
1) admixing at least one first sulfur source selected from the group consisting of hydrogen sulfide, alkali metal sulfides and alkali metal hydrosulfides, at least one polyhalo-substituted aromatic compound, at least one polar organic compound and a second sulfur source comprised of at least one organic monothiol compound represented by the formula Z-S-R' wherein Z is a halogen-free cyclic organic radical selected from the group consisting of carbocyclic and heterocyclic radicals having 1 to 4 heteroatoms as cycle members and wherein each said heteroatom is selected from the group consisting of nitrogen, oxygen, and sulfur and wherein Z has from 0 to about 4 substituents selected from the group consisting of alkyl, cycloalkyl, aryl, alkoxy, aryloxy, alkanoyl, alkanoyloxy, aroyl, alkoxycarbonyl, alkanamido, alkylamino, and alkylsulfonyl radicals, R' is selected from the group consisting of H and M/y where M is a metal selected from the group consisting of lithium, sodium, potassium, rubidium, cesium, magnesium, calcium, strontium and barium, and y is the valence of M and wherein the -S-R' of said Z-S-R' is attached directly to a carbon atom which is a cycle member of said Z, to form an admixture; and
2) subjecting said admixture to polymerization conditions sufficient to produce a polymerization reaction mixture comprising said arylene sulfide polymer.

2. A process according to claim 1 wherein the gram-mole fraction of said organic monothiol compound in said admixture is about 0.001 to about 0.1 based on the sum of the gram-moles of said first sulfur source and the gram-moles of said organic monothiol compound.

3. A process according to claim 2 wherein said polyhalo-substituted aromatic compound is selected from the group consisting of p-dihalobenzenes having the formula

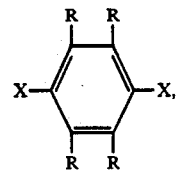

m-dihalobenzenes having the formula

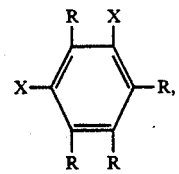

o-dihalobenzenes having the formula

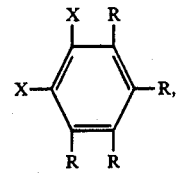

polyhalo-substituted aromatic compounds having the formula $R''(X)_n$ and mixtures thereof, wherein X is a halogen selected from the group consisting of chlorine, bromine and iodine, R is hydrogen or an alkyl radical of 1-4 carbon atoms, R" is a polyvalent aromatic radical having a valence n and n is an integer of 3-6.

4. A process according to claim 3 wherein said polar organic compound is selected from the group consisting of amides, sulfones and ureas.

5. A process according to claim 4 wherein said halogen-free cyclic organic radical Z contains about 5 to about 25 carbon atoms.

6. A process according to claim 5 wherein Z is selected from the group consisting of phenyl, 2-pyridyl, 2-benzo[b]thienyl, 6-isobenzofuranyl, 2-pyrazinyl, 2-indolizinyl, 1-naphthyl, 4-biphenylyl, 3-quinolyl, 2-anthryl, 2-thianthrenyl, 2-phenoxathiinyl, 2-acridinyl, 4-isoquinolyl, 1-phenazinyl, 7-quinoxalinyl, 6-quinazolinyl, 4-tert-amylphenyl, 2-sec-butylphenyl, 2-tert-butylphenyl, 4-tert-butylphenyl, 2,4-di-tert-butylphenyl, 2,6-diethylphenyl, 3,4-dimethylphenyl, 4-ethylphenyl, 2-isopropylphenyl, 2-methoxyphenyl, 3-methoxyphenyl, 4-methoxyphenyl, 2-methylphenyl, 3-methylphenyl, 4-methylphenyl, 2,4,5-trimethylphenyl, 4-ethylaminophenyl, 4-methanamidophenyl, 4-ethylsulfonylphenyl, 3-acetylphenyl, 4-acetoxyphenyl, and 4-carbethoxyphenyl.

7. A process according to claim 5 wherein R' is H.

8. A process according to claim 5 wherein R' is M/y where M is a metal selected from the group consisting of lithium, sodium, potassium, rubidium, cesium, magnesium, calcium, strontium and barium, and y is the valence of M.

9. A process according to claim 8 wherein M is sodium and y is 1.

10. A process according to claim 7 wherein said organic monothiol compound comprises benzenethiol, said polar organic compound comprises N-methyl-2-pyrrolidone, said polyhalo-substituted aromatic compound comprises p-dichlorobenzene, and said first sulfur source comprises sodium hydrosulfide.

11. A process according to claim 10 wherein said polymerization conditions include a temperature of about 125° C. to about 375° C. and a time of about 0.1 hour to about 72 hours.

12. A process according to claim 9 wherein said organic monothiol compound comprises sodium benzenethiolate, said polar organic compound comprises N-methyl-2-pyrrolidone, said polyhalo-substituted aromatic compound comprises p-dichlorobenzene and said first sulfur source comprises sodium hydrosulfide.

13. A process according to claim 12 wherein said sodium benzenethiolate is formed in situ in said admixture.

14. An arylene sulfide polymer produced by the method of claim 1 having an extrusion rate of at least about 50 g/10 minutes.

15. An arylene sulfide polymer produced by the method of claim 9 having an extrusion rate of about 75 to about 1000 g/10 minutes.

16. A process for preparing arylene sulfide polymer comprising
1) admixing at least one first sulfur source selected from the group consisting of hydrogen sulfide, alkali metal sulfides and alkali metal hydrosulfides, at least one polyhalo-substituted aromatic compound, and at least one polar organic compound to form an admixture; and
2) subjecting said admixture to polymerization conditions sufficient to produce a polymerization reaction mixture comprising said arylene sulfide polymer wherein there is added to said polymerization reaction mixture after polymerization commences but prior to substantial completion of polymerization a second sulfur source comprised of at least one organic monothiol compound having the formula Z-S-R' wherein Z is a halogen-free cyclic organic radical selected from the group consisting of carbocyclic and heterocyclic radicals having 1 to 4 heteroatoms as cycle members and wherein each said heteroatom is selected from the group consisting of nitrogen, oxygen, and sulfur and wherein Z has from 0 to about 4 substituents selected from the group consisting of alkyl, cycloaklyl, aryl, alkoxy, aryloxy, alkanoyl, alkanoyloxy, aroyl, alkoxycarbonyl, alkanamido, alkylamino, an d alkylsuflonyl radicals, R' is selected from the group consisting of H and M/y where M is a metal selected from the group consisting of lithium, sodium, potassium, rubidium, cesium, magnesium, calcium, strontium, and barium and y is the valence of M and wherein the -S-R' of said Z-S-R' is attached directly to a carbon atom which is a cycle member of said Z.

17. A process according to claim 16 wherein the amount of said organic monothiol compound added to said polymerization reaction mixture is sufficient to provide a gram-mole fraction of said organic monothiol compound in said admixture of about 0.001 to about 0.1 based on the sum of the gram-moles of said first sulfur source and the gram-moles of said organic monothiol compound.

18. A process according to claim 17 wherein said polyhalo-substituted aromatic compound is selected from the group consisting of p-dihalobenzenes having the formula

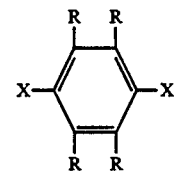

m-dihalobenzenes having the formula

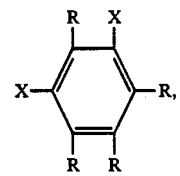

o-dihalobenzenes having the formula

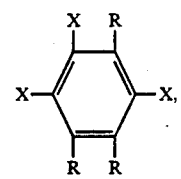

polyhalo-substituted aromatic compounds having the formula $R''(X)_n$ and mixtures thereof wherein X is a halogen selected from the group consisting of chlorine, bromine and iodine, R is hydrogen or an alkyl radical of 1-4 carbon atoms, R" is a polyvalent aromatic radical having a valence n and n is an integer of 3-6.

19. A process according to claim 18 wherein said polar organic compound is selected from the group consisting of amides, sulfones and ureas.

20. A process according to claim 19 wherein said halogen-free cyclic organic radical Z contains about 5 to about 25 carbon atoms.

21. A process according to claim 20 wherein said cyclic organic radical Z is selected from the group consisting of phenyl, 2-pyridyl, 2-benzo[b]thienyl, 6-isobenzofuranyl, 2-pyrazinyl, 2-indolizinyl, 1-naphthly, 4-biphenylyl, 3-quinolyl, 2-anthryl, 2-thianthrenyl, 2-phenoxathiinyl, 2-acridinyl, 4-isoquinolyl, 1-phenazinyl, 7-quinoxalinyl, 6-quinazolinyl, 4-tert-amlphenyl, 2-secbutylphenyl, 2-tert-butylphenyl, 4-tert-butylphenyl, 2,4-di-tert-butylphenyl, 2,6-diethylphenyl, 3,4-dimethylphenyl, 4-ethylphenyl, 2-isopropylphenyl, 2-methoxyphenyl, 3-methoxyphenyl, 4-methoxyphenyl, 2-methylphenyl, 3-methylphenyl, 4-methylphenyl, 2,4,5-trimethylphenyl, 4-ethylaminophenyl, 4-methanamidophenyl, 4-ethylsulfonyl-phenyl, 3-acetylphenyl, 4-acetoxyphenyl, and 4-carbethoxyphenyl.

22. A process according to claim 20 wherein R' is H.

23. A process according to claim 20 wherein R' is M/y where M is a metal selected from the group consisting of lithium, sodium, potassium, rubidium, cesium, magnesium, calcium, strontium, and barium and y is the valence of M.

24. A process according to claim 23 wherein M is sodium and y is 1.

25. A process according to claim 22 wherein said organic monothiol compound comprises benzenethiol, said polar organic compound comprises N-methyl-2-pyrrolidone, said polyhalo-substituted aromatic compound comprises p-dichlorobenzene and said first sulfur source comprises sodium hydrosulfide.

26. A process according to claim 25 wherein said polymerization conditions include a temperature of about 125° C. to about 375° C. and a time of about 0.1 hour to about 72 hours.

27. A process according to claim 24 wherein said organic monothiol compound comprises sodium benzenethiolate, said polar organic compound comprises N-methyl-2-pyrrolidone, said polyhalo-substitued aromatic compound comprises p-dichlorobenzene and said first sulfur source comprises sodium hydrosulfide.

28. A process according to claim 27 wherein said sodium benzenethiolate is formed in situ in said polymerization reaction mixture.

29. An arylene sulfide polymer produced by the method of claim 16 having an extrusion rate of at least about 50 g/10 minutes.

30. An arylene sulfide polymer produced by the method of claim 24 having an extrusion rate of about 75 to about 1,000 g/10 minutes.

31. A process for preparing arylene sulfide polymer comprising adding, prior to substantial completion of polymerization, a second sulfur source comprised of at least one organic monothiol compound to a polymerization reaction mixture comprised of at least one first sulfur source selected from the group consisting of hydrogen sulfide, alkali metal sulfides and alkali metal hydrosulfides, at least one polyhalo-substituted aromatic compound, and at least one polar organic compound;
wherein said organic monothiol compound is represented by the formula Z-S-R' wherein Z is a halogen-free cyclic organic radical selected from the group consisting of carbocyclic and heterocyclic radicals having 1 to 4 heteroatoms as cycle members and wherein each said heteroatom is selected from the group consisting of nitrogen, oxygen, and sulfur and wherein Z has from 0 to about 4 substituents selected from the group consisting of alkyl, cycloalkyl, aryl, alkoxy, aryloxy, alkanoyl, alkanoyloxy, aroyl, alkoxycarbonyl, alkanamido, alkylamino, and alkylsulfonyl radicals, R' is selected from the group consisting of H and M/y where M is a metal selected from the group consisting of lithium, sodium, potassium, rubidium, cesium, magnesium, calcium, strontium, and barium, and y is the valence of M, and wherein the -S-R' of said Z-S-R' is attached directly to a carbon atom which is a cycle member of said Z;

and recovering said arylene sulfide polymer from said polymerization reaction mixture.

32. In a process for preparing arylene sulfide polymer comprising admixing components comprised of at least one first sulfur source source selected from the group consisting of hydrogen sulfide, alkali metal sulfides and alkali metal hydrosulfides, at least one polyhalo-substituted aromatic compound, and at least one polar organic compound under polymerization conditions sufficient to produce said arylene sulfide polymer, the improvement comprising admixing as a further component a second sulfur source comprised of at least one organic monothiol compound represented by the formula Z-S-R' wherein Z is a halogen-free cyclic organic radical selected from the group consisting of carbocyclic and heterocyclic radicals having 1 to 4 heteroatoms as cycle members and wherein each said heteroatom is selected from the group consisting of nitrogen, oxygen, and sulfur and wherein Z has from 0 to about 4 substituents selected from the group consisting of alkyl, cycloalkyl, aryl, alkoxy, aryloxy, alkanoyl, alkanoyloxy, aroyl, alkoxycarbonyl, alkanamido, alkylamino, and alkylsulfonyl radicals, R' is selected from the group consisting of H and M/y where M is a metal selected from the group consisting of lithium, sodium, potassium, rubidium, cesium, magnesium, calcium, strontium and barium, and y is the valence of M and wherein the -S-R' of said Z-S-R' is attached directly to a carbon atom which is a cycle member of said Z.

33. A process according to claim 32 wherein said organic monothiol compound Z-S-R' is added prior to the start of polymerization.

34. A process according to claim 32 wherein said organic monothiol compound Z-S-R' is added after polymerization has started but prior to substantial completion of polymerization.

35. A method for increasing the extrusion rate of arylene sulfide polymer prepared by subjecting components comprised of at least one first sulfur source selected from the group consisting of hydrogen sulfide, alkali metal sulfides and alkali metal hydrosulfides, at least one polyhalo-substituted aromatic compound, and at least one polar organic compound to polymerization conditions sufficients to produce said arylene sulfide polymer, said method comprising adding as a further component a second sulfur source comprised of at least one organic monothiol compound represented by the formula Z-S-R' wherein Z is a halogen-free cyclic organic radical selected from the group consisting of carbocyclic and heterocyclic radicals having 1 to 4 heteroatoms as cycle members and wherein each said heteroatom is selected from the group consisting of nitrogen, oxygen, and sulfur and wherein Z has from 0 to about 4 substituents selected from the group consisting of alkyl, cycloalkyl, aryl, alkoxy, aryloxy, alkanoyl, alkanoyloxy, aroyl, alkoxycarbonyl, alkanamido, alkylamino, and alkylsulfonyl radicals, R' is selected from the group consisting of H and M/y where M is a metal selected from the group consisting of lithium, sodium, potassium, rubidium, cesium, magnesium, calcium, strontium and barium, and y is the valence of M and wherein the -S-R' of said Z-S-R' is attached directly to a carbon atom which is a cycle member of said Z.

36. A method according to claim 35 wherein said organic monothiol compound Z-S-R' is added prior to the start of polymerization.

37. A method according to claim 35 wherein said organic monothiol compound Z-S-R' is added after polymerization has started but prior to substantial completion of polymerization.

38. A process for preparing arylene sulfide polymer comprising adding to a polymerization reaction mixture comprised of at least one polyhalo-substituted aromatic compound, at least one polar organic compound, and at least one first sulfur source selected from the group consisting of hydrogen sulfide, alkali metal sulfides and alkali metal hydrosulfides, at any time prior to substantial completion of polymerization, a second sulfur source, comprised of at least one organic monothiol compound represented by the formula Z-S-R' wherein Z is a halogen-free cyclic organic radical selected from the group consisting of carbocyclic and heterocyclic radicals having a 1 to 4 heteroatoms as cycle members and wherein each said heteroatom is selected from the group consisting of nitrogen, oxygen and sulfur and wherein Z has from 0 to about 4 substituents selected from the group consisting of alkyl, cycloalkyl, aryl, alkoxy, aryloxy, alkanoyl, alkanoyloxy, aroyl, alkoxycarbonyl, alkanamido, alkylamino and alkylsulfonyl radicals, R' is selected from the group consisting of H and M/y where M is a metal selected from the group consisting of lithium, sodium, potassium, rubidium, cesium, magnesium, calcium, strontium, and barium, and y is the valence of M and wherein the -S-R' of said Z-S-R' is attached directly to a carbon atom which is a cycle member of said Z.

* * * * *

UNITED STATES PATENT AND TRADEMARK OFFICE
CERTIFICATE OF CORRECTION

PATENT NO. : 5,296,579

DATED : March 22, 1994

INVENTOR(S) : Jon F. Geibel et al

It is certified that error appears in the above-identified patent and that said Letters Patent is hereby corrected as shown below:

Column 14, claim 35, line 46, please delete "sufficients" and insert therefor ---sufficient---.

Signed and Sealed this

Fourteenth Day of February, 1995

Attest:

BRUCE LEHMAN

*Attesting Officer*  *Commissioner of Patents and Trademarks*